June 16, 1953 — R. A. HARTMAN — 2,641,814
SEPARABLE FASTENER
Filed Jan. 25, 1951
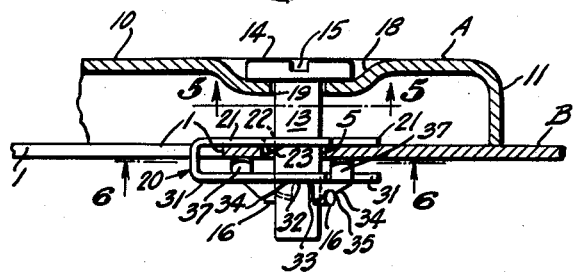
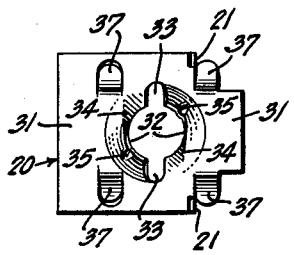
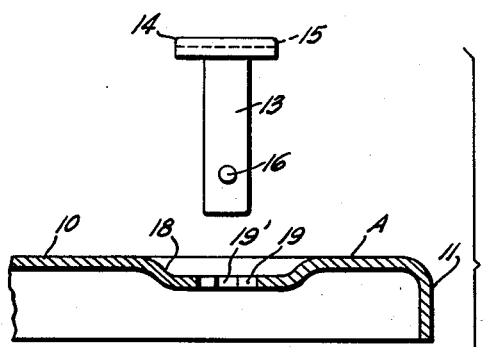
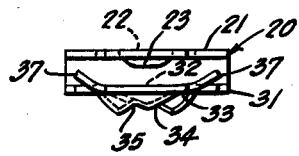
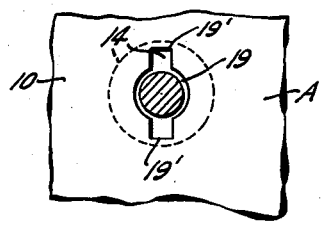
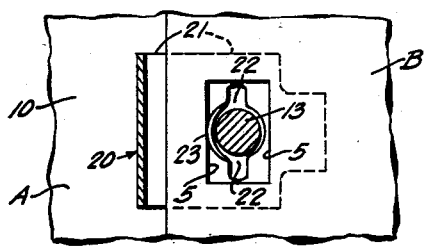
INVENTOR.
RICHARD A. HARTMAN
BY
H. G. Lombard
ATTORNEY Patented June 16, 1953

2,641,814

UNITED STATES PATENT OFFICE 2,641,814

SEPARABLE FASTENER

Richard A. Hartman, Cleveland, Ohio, assignor to Tinnerman Products, Inc., Cleveland, Ohio, a corporation of Ohio Application January 25, 1951, Serial No. 207,806

3 Claims. (Cl. 24—221)

This invention relates to improvements in separable fasteners which are adapted to be easily and quickly actuated to secure or release the parts of an assembly wherein speed in fastening or unfastening of the assembly is necessary or desirable.

The invention has particular application and use in the provision of separable assemblies wherein a panel or plate-like part is releasably secured over a supporting part as, for example, in the manner of a cover for a junction box or other container, or as a similar cover or closure for a panel opening or access opening, or the like.

Separable fasteners of this character are commonly known as rotary fasteners and comprise a stud equipped with lateral lugs and adapted by a quarter turn to be engaged with or disengaged from a cooperating socket member. Heretofore, it has been the usual practice to attach the socket member of such a fastener by separate bolts, screws, rivets, or other auxiliary fastening means requiring special assembling operations for applying the same. In the rotary fastener of the present invention, the socket member is adapted to be easily and quickly attached in self-sustained position on a supporting part without the use of bolts, screws, rivets or other separate fasteners, thereby providing for considerable savings in the cost of such separate fasteners and in the time and labor required for the special operations for applying the same.

A primary object of the invention, accordingly, is to provide a rotary fastener, such as described, in which the socket member is provided as a one-piece sheet metal fastening member adapted to be attached in self-sustained fastening position in an assembly without the use of auxiliary means for securing the same in such attached fastening position.

Another object of the invention is to provide such a socket member for a rotary fastener which is in the form of a simple U-shaped sheet metal body adapted to be applied easily and quickly to self-retained attached position on a supporting part in clasping relation with said supporting part.

A further object of the invention is to provide a rotary fastener including a socket member, such as described, together with a simple rotary stud having a cross-pin securing element which is operated by a quarter turn in the manner of a cowl fastener, or the like, to provide a fastening assembly that is easily and quickly secured or released.

Another object of the invention is to provide a rotary fastener in which the socket member embodies any or all the foregoing features and which is adapted for an adjustable attachment in fastening position on its supporting part to compensate for misalignment and manufacturing variations in the parts secured.

Further objects and advantages, and other new and useful features in the construction, arrangement and general combination of elements of the improved fastener of the invention will be readily apparent as the following description proceeds with reference to the accompanying drawings, for purposes of illustration but not of limitation, in which like reference characters designate like parts throughout, and in which:

Fig. 1 is a vertical sectional view through an assembly of a cover plate or the like on a supporting part and showing a rotary fastener in accordance with the invention as employed to secure the assembly;

Fig. 2 is an exploded view of the several parts of the assembly of Fig. 1, showing the fastener members in position to be applied to the respective parts secured thereby in the completed assembly;

Fig. 3 is a bottom plan view of the socket member of the rotary fastener as seen in Figs. 1 and 2;

Fig. 4 is an end view of the socket member seen in Fig. 3;

Fig. 5 is a sectional view of Fig. 1 along line 5—5, looking in the direction of the arrows; and Fig. 6 is a sectional view of Fig. 1 along line 6—6, looking in the direction of the arrows and showing the means for locking the socket member of the fastener in adjustable attached position on its supporting part.

Referring now, more particularly, to the drawings, there is illustrated in Fig. 1 the secured portions of a pair of superposed plate or panel-like parts A, B, substantially in the manner in which such parts would be arranged to provide the part A as a cover for an opening defined by the marginal edge of an opening 1 in the fixed or supporting part B.

The parts A, B, may be of any metal, wood, plastic or other suitable material and provided in any desired shape or design. In the present example, the parts A, B, are shown as provided in the manner of sheet metal stampings or the like, with the cover or other removable part A comprising a body portion 10 having a downturned peripheral flange 11 extending in normal abutting relation to the part B. The removable part or cover plate A is provided at spaced points around its periphery with as many rotary stud fasteners 13 as may be necessary for securing said cover plate in operative position on the fixed part B. The rotary stud fasteners are of a standard design having an enlarged head 14 at one end provided with a tool receiving slot 15 and a cross-pin adjacent the other end thereof defining laterally projecting ears or lugs 16. Preferably the rotary fastener 13 is attached to said part A with its head 14 in flush relation to the outer exposed surface of said part. To this end, the part A is provided with an apertured countersink or depression 18 in which the aperture 19 therein includes a pair of lateral slots 19′, Fig. 5, conforming to the disposition of the lugs 16 on the rotary stud fastener 13. The rotary stud 13, accordingly, is readily received in the aperture 19 with the lugs 16 thereon passing through the lateral slots 19′ in said aperture, whereupon any slight turn of the stud to position the lugs 16 out of line with said slots 19′ serves to prevent withdrawal of the stud 13 from attached position in said aperture 19.

The fixed or supporting part B is provided with a recess 5 in line with the rotary stud 13 for the attachment of the cooperating socket member 20 of the fastener. The recess 5, Fig. 6, is disposed adjacent to and suitably spaced from the marginal edge of the panel opening 1 in the supporting part B and may be of any suitable outline, but preferably is provided in the manner of a slightly oversize rectangular slot extending lengthwise in the direction of the adjacent marginal edge of the opening 1 in the supporting part B.

The socket member of the fastener, designated generally 20, is provided as a simple inexpensive one-piece sheet metal device in a substantially U-shaped form comprising a pair of arms 21, 31, adapted to clasp the marginal edge of the supporting part B over the recess 5 therein. The inner or attaching arm 21 of the socket member is provided with a stud passage 22 having lateral slots for passing the lateral lugs 16 on the rotary stud. The stud passage 22 is provided together with a locking detent or shoulder 23 preferably in the form of a raised collar or hub portion bordering said passage 22 and having its free edge portion in the form of a cam surface sloping downwardly toward the free end of said arm 21 as seen in Figs. 1 and 2.

The outer arm 31 of the U-shaped socket member 20 is provided with a similar stud passage 32 having lateral slots 33, Fig. 3, for passing the lateral lugs 16 on the stud, and is substantially in line with the stud passage 22 on the inner arm 21. The portions adjoining said stud passage 32 are bent outwardly in the manner of oppositely extending spiral-like cam surfaces 34 each rising gradually from adjacent one lateral slot 33 toward the other lateral slot 33. Each cam surface 34 is provided substantially at its highest point with a groove or notch 35, Fig. 3, adapted to receive and retain the lateral lugs 16 on the rotary stud in secured position. The arm 31 otherwise is provided with pairs of inwardly extending spring tabs or fingers 37 on opposite sides of the cam surfaces 34. These spring tabs or fingers 37 are arranged to bear upon the part B and maintain said arm 31 and the cam surfaces 34 thereon in yieldable spaced relation to said part B in a manner whereby said cam surfaces 34 are adapted to yield as the rotary stud 13 is applied to fastening engagement therewith, as presently to be described. The spring tabs 37 also serve to adapt the socket member 20 for attachment to supporting parts B of different thicknesses and provide for a firm and rigid seating of the fastener member 20 in attached position on any such supporting part B.

As best seen in Fig. 2, the U-shaped socket member 20 is provided with the arms 21, 31, thereof spaced apart greater than the thickness of the supporting part B so that said socket member 20 is adapted to be easily and quickly slipped over the edge of said supporting part B on being initially applied. As the socket member 20 is pushed to its fully attached fastening position, shown in Fig. 1, the sloping cam surface on the locking detent 23 cams over the adjacent edge of the supporting part B to cause a gradual spreading of said arms 21, 31, as necessary to permit said detent 23 to clear said edge of part B and snap into the assembling recess 5 in said part B. Said detent 23 defines a pronounced shoulder having suitable clearance in the recess 5 to provide a slightly adjustable attachment of the socket member 20 in a manner whereby said detent 23 engages the wall of said recess 5 to lock said socket member 20 in attached position while otherwise leaving a suitable passage for the stud member 13 to be applied to said socket member 20 for securing the parts A, B, in a completed fastening installation. As illustrated in Fig. 1, the spring tabs 37 bear uniformly upon the part B with the detent 23 received in the recess 5 and, in this relation, these elements cooperate with the attaching arm 21 to retain the socket member 20 firmly and rigidly in attached position on the supporting part B but capable of slight sliding adjustment as may be necessary or desirable, as aforesaid.

In operation, in the assembled position of part A on part B, the rotary stud 13 carried by part A is projected through the passage 22 in the inner or attaching arm of the socket member 20 and through the recess 5 in part B, and the similar passage 32 in the outer arm 31 of said socket member. The lateral lugs or ears 16 on the rotary stud 13, accordingly, finally extend through the lateral slots 33 of the passage 32 in the outer arm 31, Fig. 3, in the operative position of the parts A, B, as shown in Fig. 1, whereupon said lateral lugs 16 are in position to engage or slightly clear the lowest points of the spiral cam surfaces 34 on said outer arm 31 of the socket member. The rotary stud 13 is then subjected to its initial clockwise turning movement, as by a screw driver applied to the tool receiving slot 15 in the head thereof. Upon continued rotation of the stud through a quarter turn or other predetermined portion of a single revolution, said lateral lugs 16 ride up upon the spiral cam surfaces 34 in a manner whereby the arm 31 is depressed and thereby flexed under tension to cause the parts A, B, to be clamped together under progressively increasing spring force. When turning of the stud 13 places the lateral lugs 16 in the region of the grooves or notches 35, said lugs snap into said grooves 35 in a manner whereby further rotation of the stud is arrested and the same otherwise locked in such applied fastening position, substantially as shown in Fig. 1. In this relation, there is a pronounced inward tensioning force on the arm 31 and a corresponding flexing or yielding of the spring tabs 37 which, in turn, produce a continuously effective reverse spring force tending to maintain the lateral lugs 16 rigidly seated in said grooves 35. This, of course, holds the stud 13 against any possible reverse turning toward disengagement of the lateral lugs 16 from the grooves 35 unless and until the stud is rotated reversely by the application of a suitable tool in properly uncoupling the stud from the socket member 20.

The fastening arrangement, accordingly, is such as to lock together the cooperating members 13, 20, of the fastening device against accidental or unintended release from secured position while otherwise clamping the secured parts A, B, firmly and rigidly together in such a manner as to prevent any possible looseness or displacement of said parts even under extreme conditions of vibratory motion, or the like.

Quick and easy release of the secured parts A, B, may be readily effected simply by rotating the stud 13 in a reverse direction under tool force, whereupon the lateral lugs 16 will cause a suitable flexing and depression of the arm 31 as necessary to permit said lugs 16 to move out of the grooves 35. By continued reverse rotation of the stud, said lateral lugs 16 will ride downward on the spiral cam surfaces 34, finally disengaging therefrom in the lateral slots 33, whereupon the stud is fully released and is readily separated from the socket member 20 to permit the cover or other part A to be removed from the supporting part B.

It will be appreciated that the flexing of the arm 31 of the socket member 20 either in securing or releasing the members of the fastening device results in no permanent distortion or deformation of the metal of said socket member 20 so that upon release of the fastening members 13, 20, from locked relation, as aforesaid, the various elements of the socket member 20 automatically assume their initial, normally untensioned configuration ready for coupling engagement with the stud member 13 in the same or similar installation in a repetition of the previously described procedure.

The socket member 20 of the invention preferably is constructed of relatively thin sheet metal the thickness of which is selected according to service requirements and the predetermined size of the parts to be secured. The socket member is most effective when provided of spring metal suitably spring tempered and otherwise treated to give the desired toughness and hardness, particularly in the case of devices which are subject to constant usage in heavy duty applications. A cheap and highly effective socket member may be provided from cold rolled metal such as cold rolled steel which is untempered but of a spring metal nature and capable of providing an effective and reliable fastening device, as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastening device comprising a piece of sheet metal bent to provide a pair of arms extending in the same general direction and adapted to clasp a part in self-sustained fastening position on said part, one of said arms having a stud passage including a lateral slot for passing a stud having a lateral lug, and the marginal portion of said stud passage being formed to provide a cam surface engageable by said lateral lug on the stud responsive to turning force on said stud, the latter arm having inwardly projecting means engageable with said part for maintaining said arm in resilient spaced relation to said part.

2. A fastening device comprising a piece of sheet metal bent to provide a pair of arms extending in the same general direction and adapted to clasp a part in self-sustained fastening position on said part, one of said arms having a stud passage including a lateral slot for passing a stud having a lateral lug and the marginal portion of said stud passage being formed to provide a cam surface engageable by said lateral lug on the stud responsive to turning force on said stud, the latter arm having spaced inward projections on its underside engageable with said part to maintain said arm in resilient spaced relation to said part.

3. A fastening device comprising a piece of sheet metal bent to provide a pair of arms extending in the same general direction and adapted to clasp a part in self-sustained fastening position on said part, one of said arms having a stud passage including a lateral slot for passing a stud having a lateral lug and the marginal portion of said stud passage being formed to provide a cam surface engageable by said lateral lug on the stud responsive to turning force on said stud, the latter arm having spaced tabs on opposite sides of the stud passage therein and projecting inwardly from said arm for engaging said part to maintain said arm in resilient spaced relation to said part.

RICHARD A. HARTMAN.

References Cited in the file of this patent

UNITED STATES PATENTS

| Number | Name | Date |
|---|---|---|
| 1,857,530 | Dandridge et al. | May 10, 1932 |
| 2,298,568 | Kost | Oct. 13, 1942 |
| 2,341,829 | Tinnerman | Feb. 15, 1944 |
| 2,362,679 | Tinnerman | Nov. 14, 1944 |
| 2,439,975 | Jones | Apr. 20, 1948 |
| 2,504,358 | Swanson | Apr. 18, 1950 |